United States Patent [19]

Sunderland

[11] Patent Number: 4,930,970
[45] Date of Patent: Jun. 5, 1990

[54] COLLAPSIBLE HOIST FOR A TRUCK BED

[76] Inventor: Nita K. Sunderland, R.R. 1, Washington, Tazewell County, Ill. 61571

[21] Appl. No.: 371,317

[22] Filed: Jun. 26, 1989

[51] Int. Cl.⁵ ............................................. B60P 1/54
[52] U.S. Cl. ..................................... 414/542; 212/182; 212/187; 212/218; 212/219; 212/227; 212/257; 414/561
[58] Field of Search ............... 414/540, 541, 542, 560, 414/561; 212/182, 187, 188, 205, 208, 210, 218, 219, 227, 257

[56] References Cited

U.S. PATENT DOCUMENTS

| | | | |
|---|---|---|---|
| 2,773,606 | 12/1956 | Shepherd | 414/542 X |
| 2,778,512 | 1/1957 | Strona | 414/542 |
| 3,091,346 | 5/1963 | Yawn | 212/182 |
| 3,768,670 | 10/1973 | Cloud | 212/257 X |
| 3,794,192 | 2/1974 | Monson | 414/542 X |
| 3,863,782 | 2/1975 | Sandrock | 414/542 |
| 3,899,089 | 8/1975 | Wardlaw | 212/182 X |
| 4,187,048 | 2/1980 | Bohlmann | 414/542 |
| 4,238,036 | 12/1980 | Lamer et al. | 212/208 X |
| 4,383,791 | 5/1983 | King | 414/542 |
| 4,419,038 | 12/1983 | Pendergraft | 293/117 X |

FOREIGN PATENT DOCUMENTS

| | | | |
|---|---|---|---|
| 0500942 | 11/1954 | Italy | 414/542 |
| 0959216 | 5/1964 | U.S.S.R. | 212/182 |
| 1049289 | 10/1983 | U.S.S.R. | 414/560 |
| 2106072 | 4/1983 | United Kingdom | 414/541 |

Primary Examiner—Robert J. Spar
Assistant Examiner—John VandenBosche
Attorney, Agent, or Firm—F. L. Hart

[57] ABSTRACT

A hoisting apparatus for the use in trucks has frame members 26, 28, 30, 32, 34 which are pivotally moveable and slidable connected to one another such that the apparatus can be assembled and disassembled by a single person and placed in a transporting position along the edges of the truck bed thereby occupying a very small portion of the load carrying space of the truck.

15 Claims, 8 Drawing Sheets

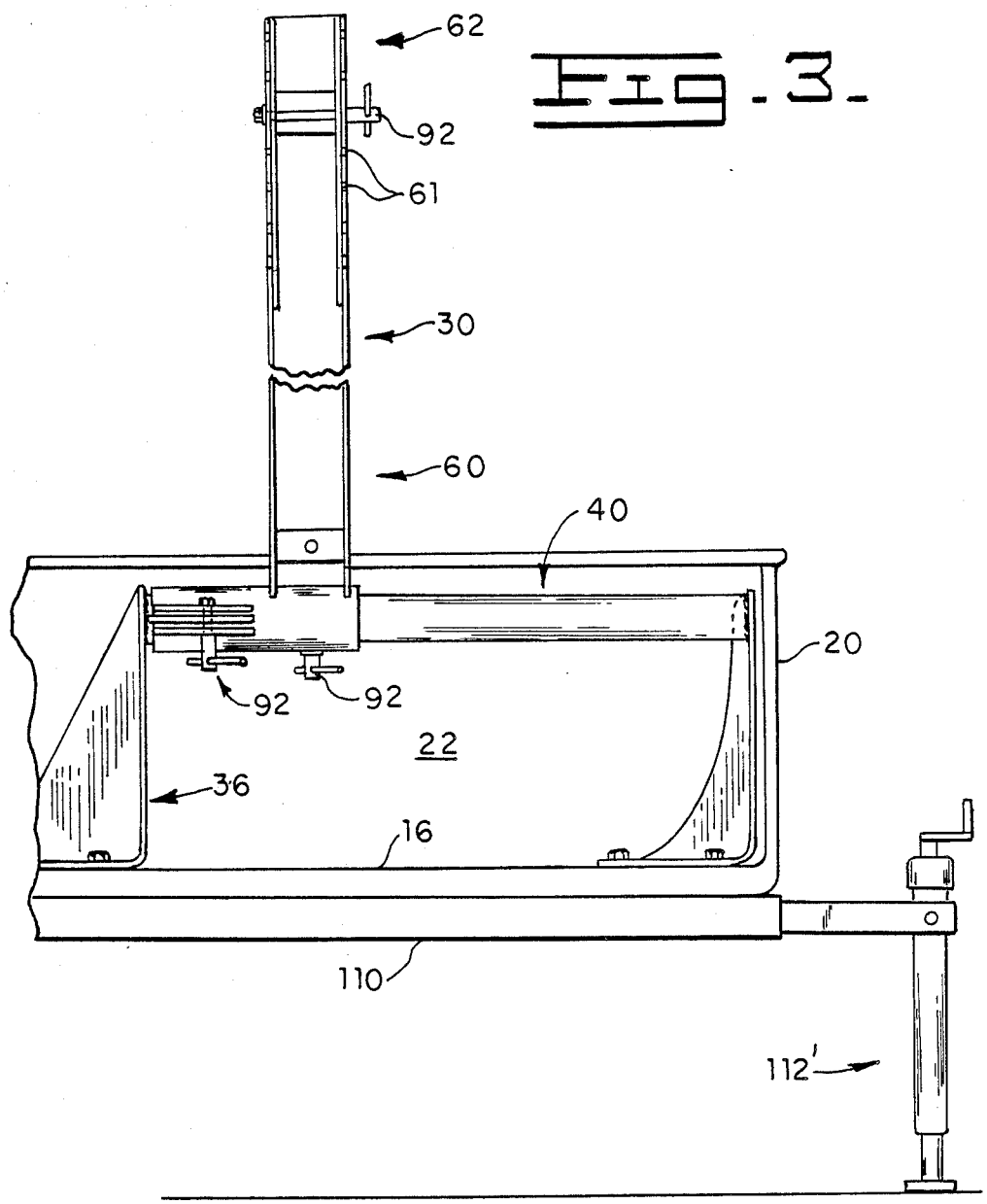

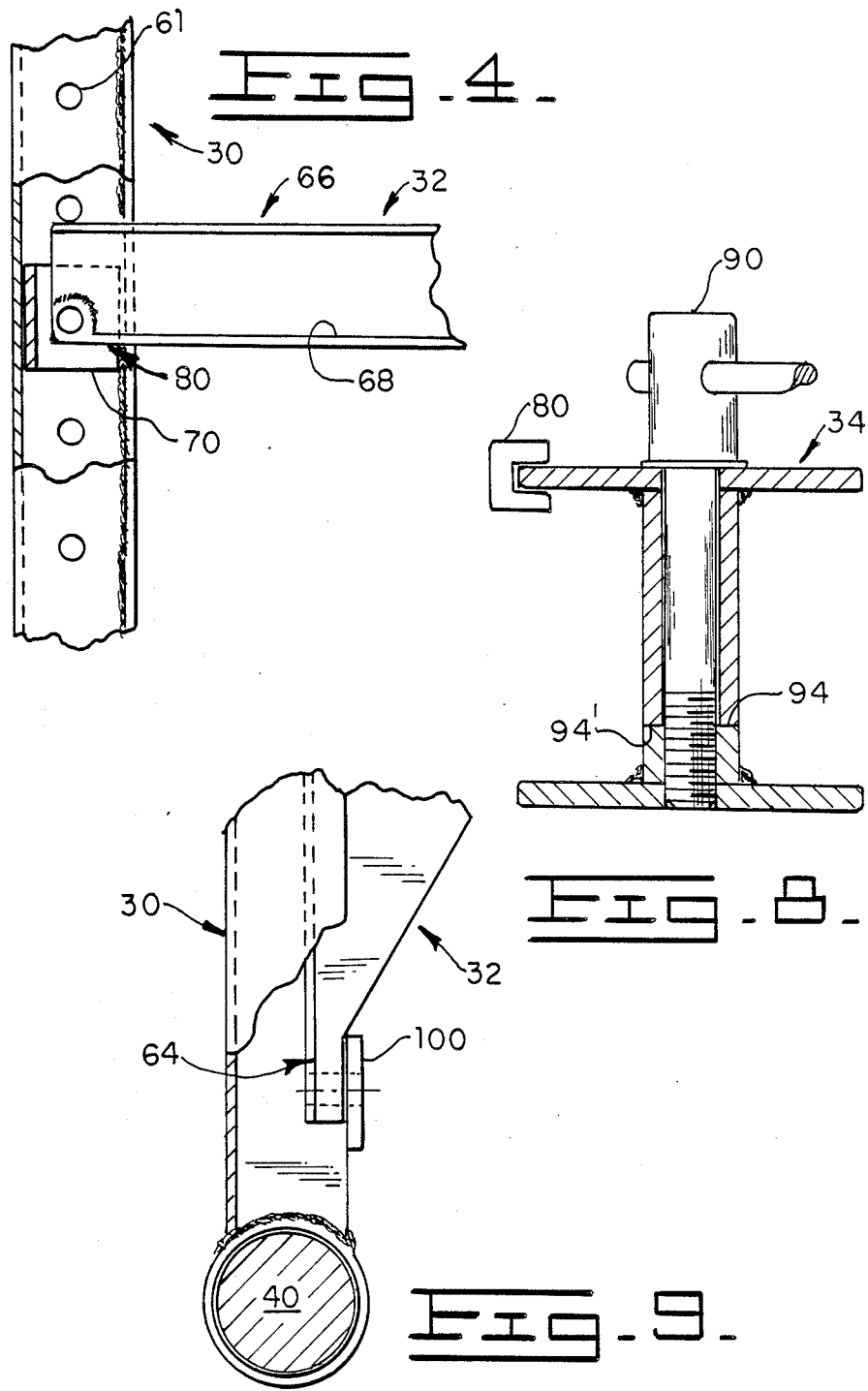

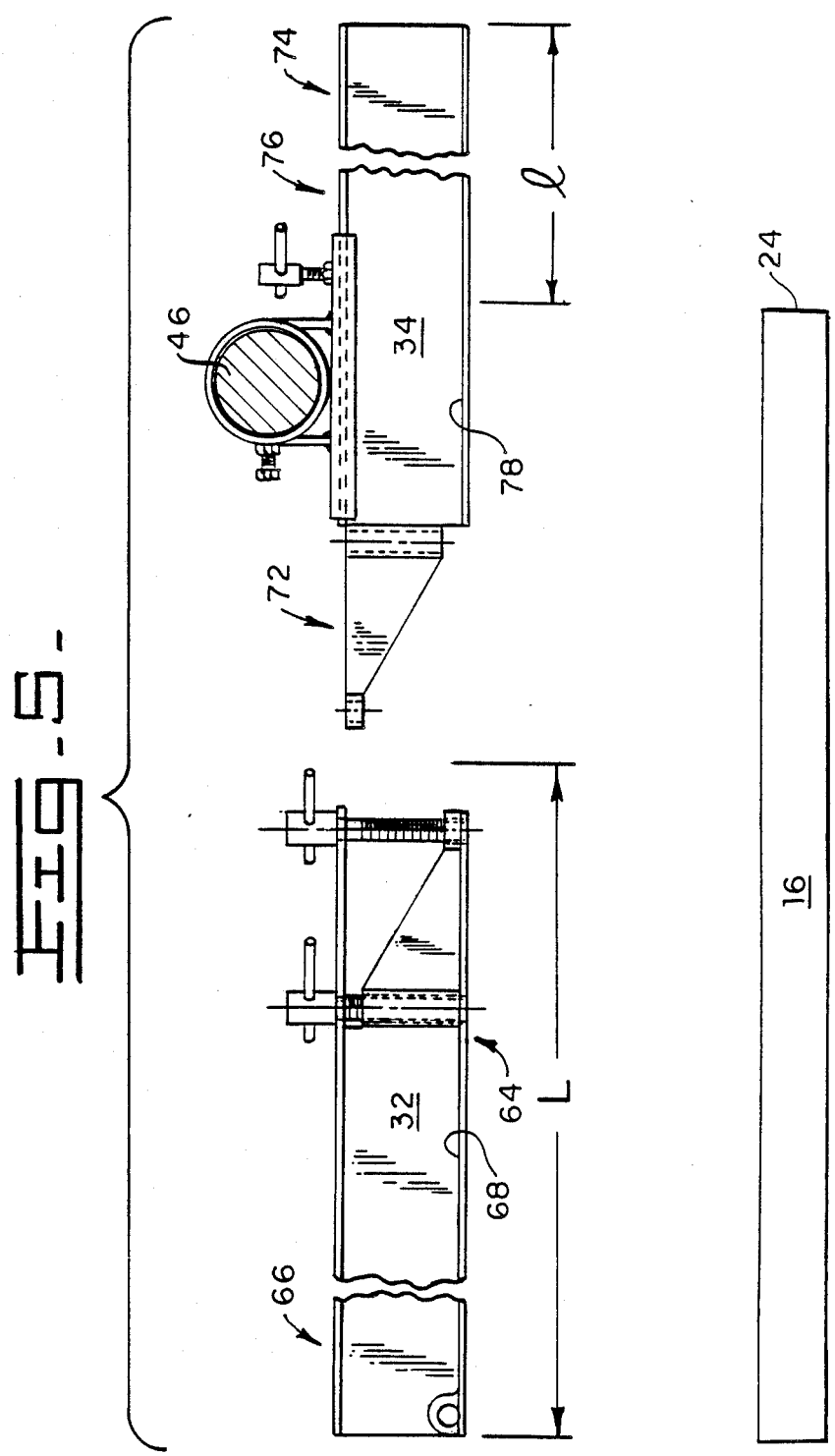

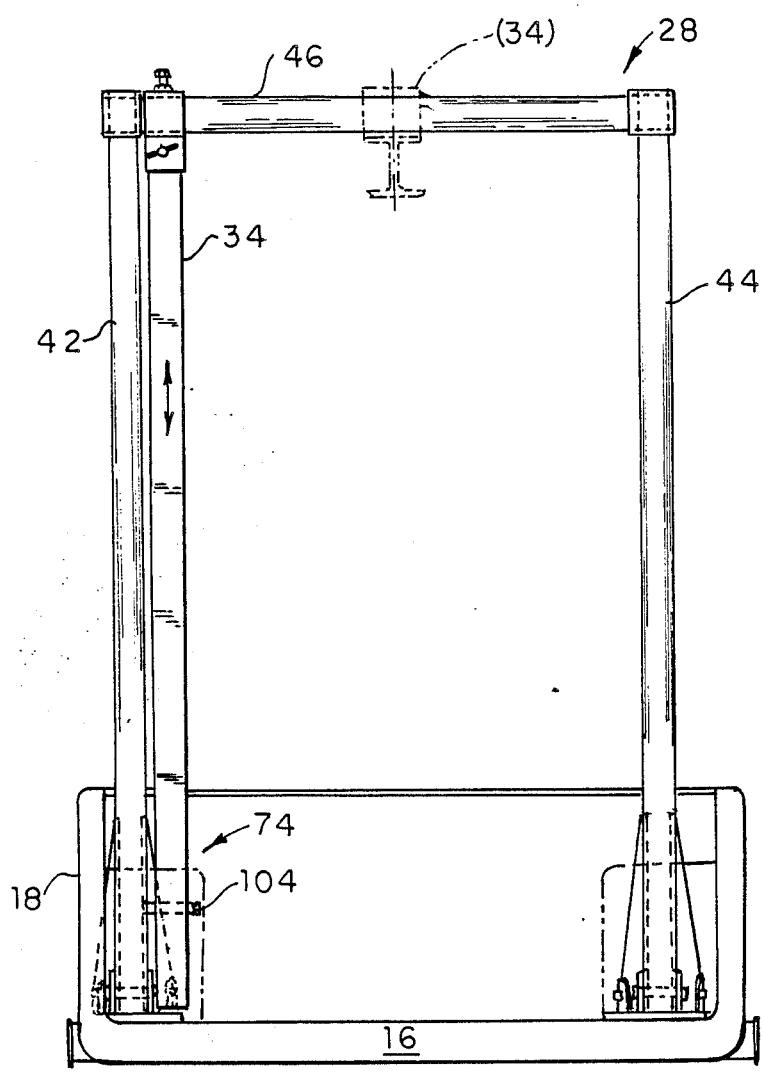

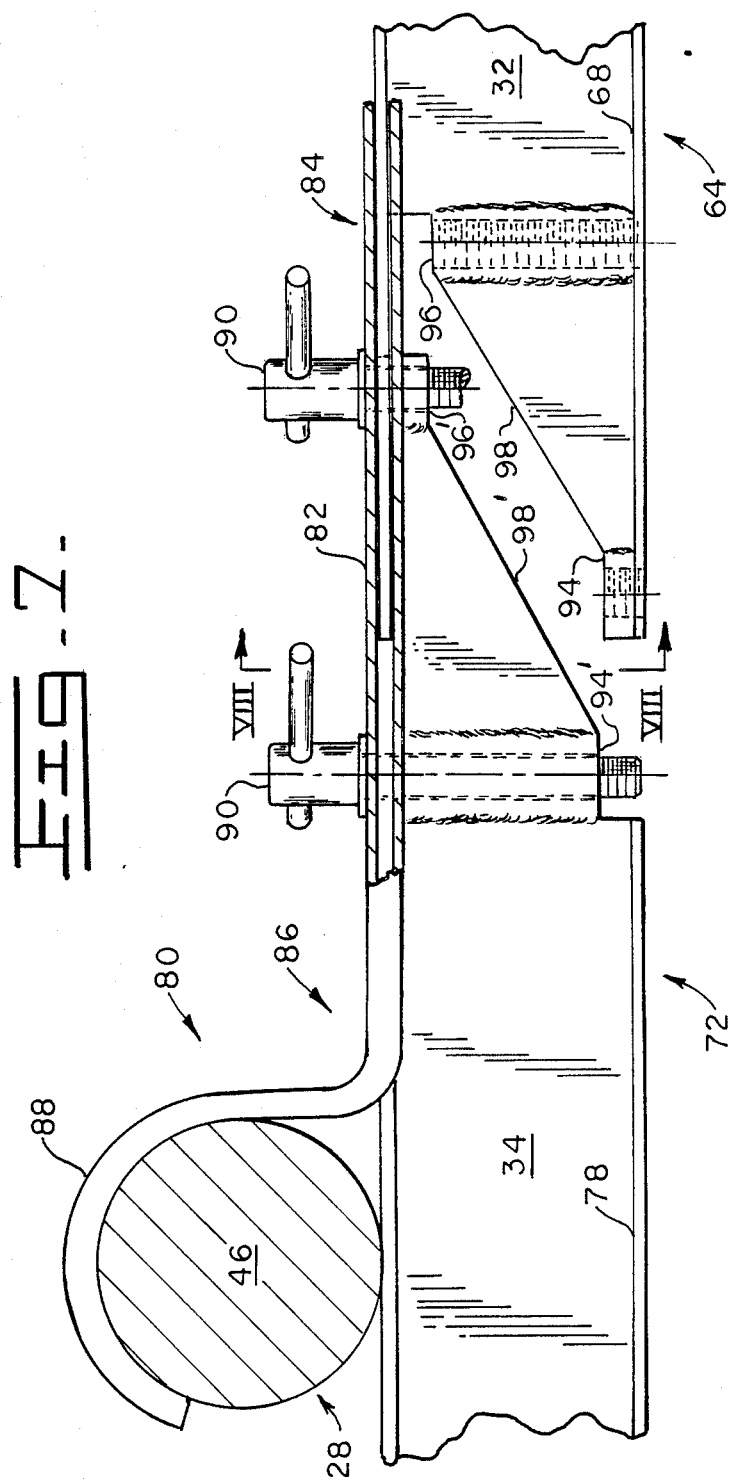

COLLAPSIBLE HOIST FOR A TRUCK BED

DESCRIPTION

1. Technical Field

This invention relates generally to hoisting apparatus and more particularly to hoisting apparatus for a truck.

2. Background

This invention relates generally to hoisting apparatus for a truck and is particularly useful as hoisting apparatus for a small truck, such as a pickup, for example.

In heretofore utilized hoisting apparatus for trucks, the apparatus is often permanently mounted in the truck. Other such apparatus are removable from the truck with some difficulty and often require the services of a plurality of men to disassemble. Once removed, the elements forming the apparatus are not conveniently stored in the truck, rattle around and cause damage to the truck bed during travel and, more particularly, are of a construction which occupies a relatively large portion of the truck bed.

The present invention is directed to overcoming the above-described problems and is particularly meritorious in the facts that a single individual can assemble and disassemble the apparatus while exerting little effort and spending little time. Further, the apparatus in the disassembled stored or transporting position occupies a very small percentage of the truck bed storage space and thereby affords the operator the opportunity to haul larger and more bulky loads.

DISCLOSURE OF THE INVENTION

In one aspect of the invention, the hoisting apparatus is adapted for a truck. A first base frame has first and second end portions and is connectable to the truck. A second base frame has first and second legs and is pivotally connectable to the truck at a location spaced from said first base frame. An upright is pivotally connected to and slidably along the first base frame. The upright is moveable between a first position at which said upright is adjacent said first base frame first end portion and extending upwardly from the first base frame and a second position at which the upright is positioned adjacent said first base frame second end portion.

A first overhead beam has first and second end portions, a track and a length "L". The beam is pivotally connectable at said second end portion to said upright. The length "L" is less than the distance between said base frames.

A second overhead beam has first and second end portions and a track. The second beam is pivotally connected to and slidable along the second base frame. The second beam is moveable between a first position at which the first end portions of the beams are adjacent and connectable one to the other, and the tracks are aligned and extend generally horizontally and a second position at which the second beam is adjacent one of the second base frame legs and the second beam and second base frame extend substantially horizontally.

A first means is provided for releasably maintaining the first overhead beam generally horizontally at the spaced apart positions of the overhead beams.

Second means are provided for maintaining the second base frame, the upright and the first and second overhead beams at said preselected positions.

BRIEF DESCRIPTION OF THE DRAWINGS

FIG. 3 is a diagrammatic view taken from the rear of the truck showing the first base frame and upright;

FIG. 4 is a diagrammatic partial side view of the upright and first overhead beam;

FIG. 5 is a diagrammatic partial side view of the overhead beams;

FIG. 6 is a diagrammatic partial rear view of the second beam moved to the transport position adjacent a leg of the second base frame;

FIG. 7 is a diagrammatic partial side view of the first and second beams and the middle portion of the second base frame;

FIG. 8 is a diagrammatic partial end view of the second beam taken along lines VIII—VIII of FIG. 7;

FIG. 9 is a diagrammatic partial side view of the upright and first beam in the transport position;

BEST MODE FOR CARRYING OUT THE INVENTION

Figure 1:
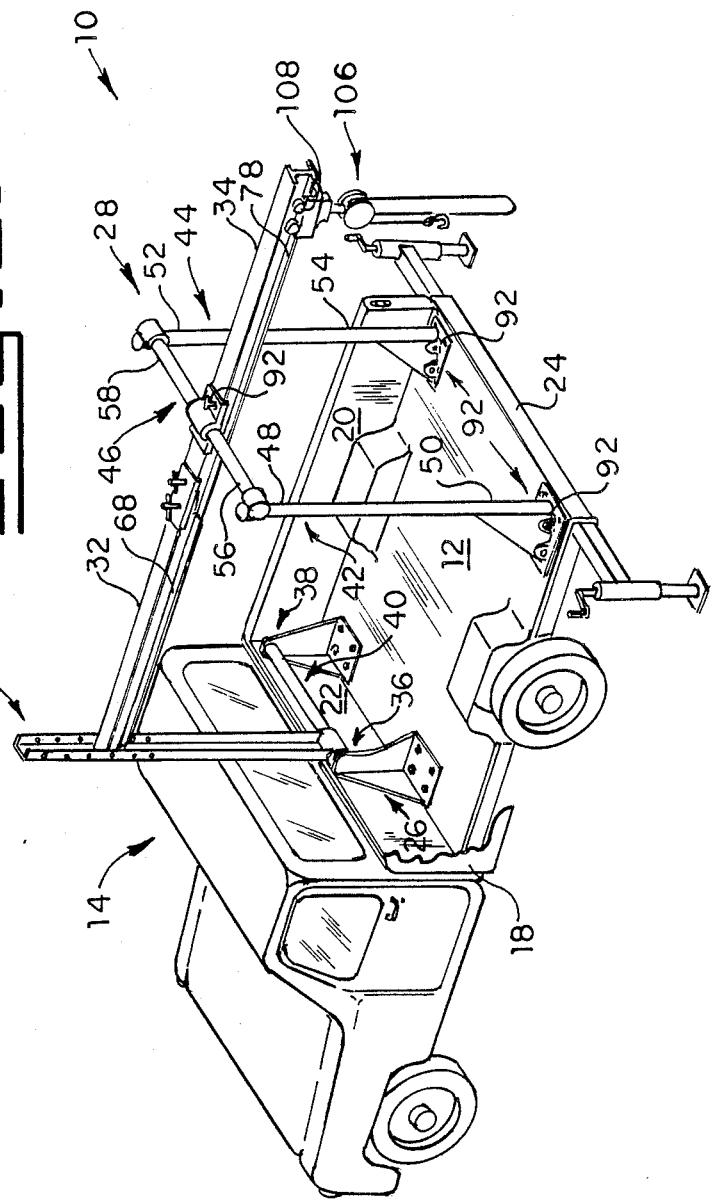
FIG. 1 is a diagrammatic schematic view of the apparatus of this invention in the loading position on a truck.

Referring to FIG. 1, the hoisting apparatus 10 is shown mounted in the cargo portion 12 of a pick-up truck 14 for example. It should be apparent that the apparatus of this invention can be utilized with flat bed trucks and trucks of various sizes.

The truck 14 has a bed 16, first and second sidewalls 18,20, a front wall 22 and a rear edge 24.

The apparatus 10 has a first base frame 26, a second base frame 28, an upright 30, and first and second overhead beams 32,34.

The first base frame 26 has first and second end portions 36,38 and a middle portion 40. The first and second end portions 36,38 are connectable to the truck bed 16 and preferably onto the framework (not shown) of the truck 14. This connection is made adjacent the truck front wall 22 with said middle portion 40 extending across at least a portion of the truck bed 16 at a location spaced from said bed 16 and said front wall 22.

The first end portion 36 of the first base frame 26 is preferably located closer to the second sidewall 20 than the first sidewall 18 so that, for example, the middle portion 40 of the first base frame 26 and a hereafter more fully described upright 30 is positionable a generally equal distance from the sidewalls 18,20 in the load lifting position of the upright 30. The second end portion 38 of the first base portion is connected adjacent, for example, the second sidewall 20, so that in the hereafter more fully described transport or disassembled position (FIG. 2), the upright 30 will be immediately adjacent the second sidewall 20.

The second base frame 28 has first and second legs 42,44 and a middle portion 46. Each of the first and second legs have first and second end portions respectfully 48,50, and 52,54. The middle portion 46 also has first and second end portions 56,58. The first and second end portions 56,58 of the middle portion 46 are each connected to the first end portion 48,52 of a respective first and second leg 42,44 at a substantial height above said truck bed 16. The second base frame 28 thereby is of a general inverted "U" configuration with the second end portion 50,54 of the legs 42,44 pivotally connectable to the truck bed at a location adjacent said rear edge 24 and adjacent respective sidewalls 18,20.

As stated with respect to the first base frame 26, the second base frame 28 is likewise preferably connectable to the truck bed and in close proximity to the respective sidewalls 18,20.

The middle portions 40,46 of the base frames 26,28 and the legs 42,44 of the second base frame 28 are preferably formed of tubing and are of a circular cross-sectional configuration. The upright 30 is preferably formed of a channel of "C" cross-sectional configuration. It should be understood however that members of other cross-sectional configuration can be utilized without departing from this invention.

The upright 30 has first and second end portions 60,62. The first end portion 60 of the upright 30 is pivotally and slidably connected to the middle portion 40 of the first base frame 26.

Referring to FIGS. 1 and 3, the second end portion 62 of the upright 30 preferably has a plurality of holes 61 for connecting the first overhead beam 32 thereto. A plurality of holes 61 are provided so that the overhead beams 32,34 can be adjusted and oriented generally horizontally even when the truck 14 is positioned in an incline with one end of the truck 14 lower than the opposed end.

Figure 2:
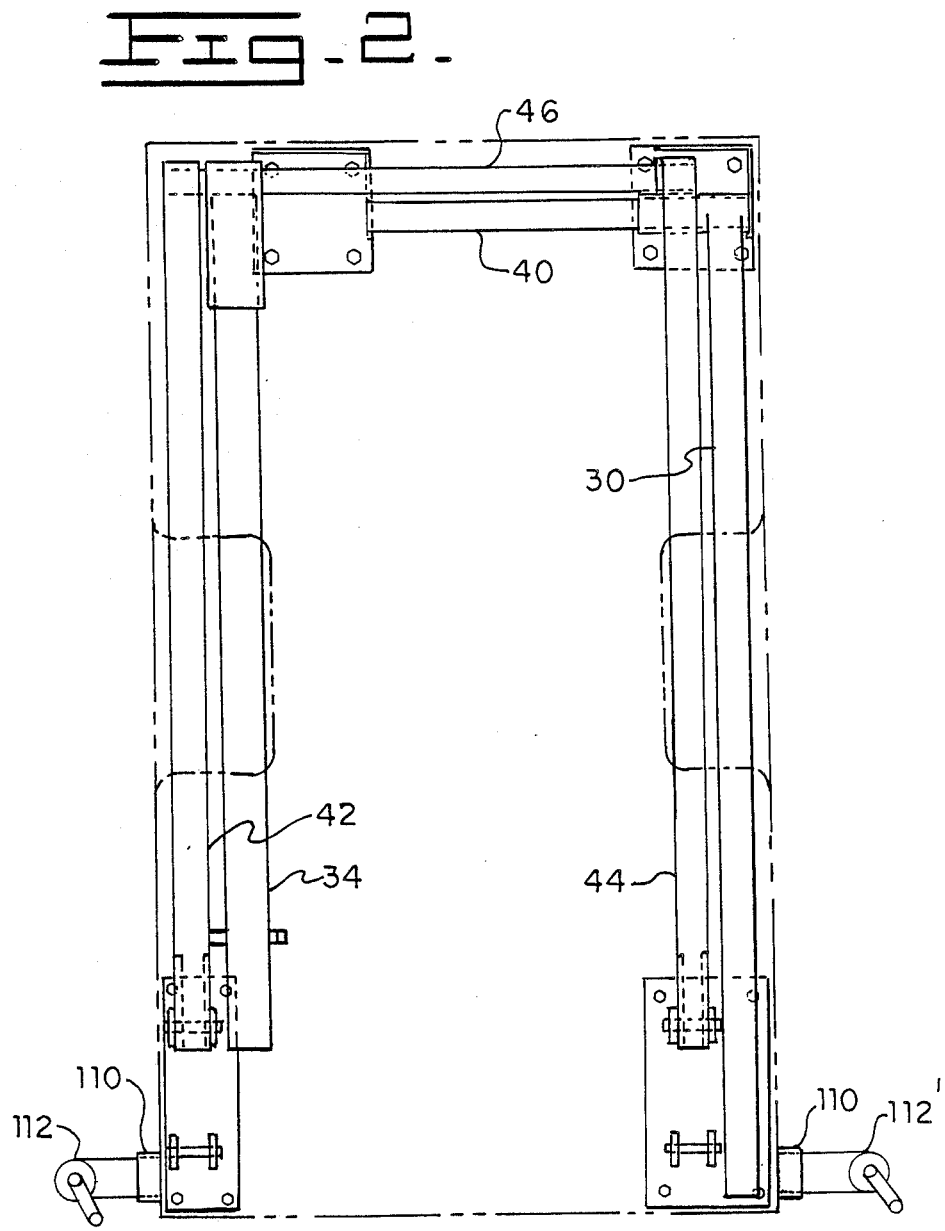
FIG. 2 is a diagrammatic schematic partial top view of the apparatus of this invention in the disassembled/transport position in the truck.

Referring to FIGS. 2 and 3, the upright 30 is pivotally moveable between a first position, shown in solid lines in FIG. 3, at which the upright 30 is generally perpendicular to the truck bed 16 and adjacent said first base frame first end portion (36) and a second or transport position, shown in FIG. 2 and in solid lines in FIG. 3, at which the upright 30 is generally horizontal, adjacent the first base frame second end portion (38) and parallel to the truck bed 16.

Referring to FIGS. 1, 3 and 4, the upright 30 is slidably movable along the first base frame middle portion 40 between a first position at which the upright 30 is generally an equal distance from the truck sidewalls 18,20 and a second or transport position at which the upright 30 is positioned adjacent one of the said truck sidewalls 18,20, preferably the second sidewall 20.

Referring to FIGS. 4 and 5, the first overhead beam 32 has first and second end portions 64,66 and a track 68. The first overhead beam 32 is releasably connected to the second end portion 62 of the upright 30 and is slidably and pivotally moveable relative to the second end portion 62 of the upright 30 in the released condition of beam 32.

The first overhead beam 32 is releasably connected to the upright 30 by bolts in other apparatus extending through openings 61 in the upright 30 and an opening in a shoe 70 (FIG. 4) which is a portion of the second end portion 66 of the first overhead beam 32. The first overhead beam 32 is pivotally connected to the shoe 70 for pivotal movement between a first position at which the first beam 32 is substantially horizontal (FIG. 1) and in a load lifting position and a second or transport position (FIG. 2) at which the first overhead beam extends along the upright 30 is generally horizontal and adjacent preferably the second sidewall 20.

The first overhead beam 32 has a length "L" less than the distance between the upright 30 and the middle position 46 of the second base frame 28 in the first positions of said upright 30 and second base frame 28.

The second overhead beam 34 has first and second end portions 72,74, a middle portion 76 and a track 78. The second beam first end position 72 is releasably connectable to the first end portion 64 of the first beam 32. The middle portion 76 of the second beam 34 is pivotally connected to the middle portion 46 of the second base frame 28. The second end portion 74 of the second beam 34 extends a preselected length "l" beyond the truck rear edge 24 in the connected position of the beams 26,28.

Referring to FIGS. 2 and 6, the second overhead beam 34 is slidably movable along the middle portion 46 of the second base frame 28 between a first position (shown in broken lines) generally an equal distance from the truck first and second sidewalls 18,20 or the second base frame first and second legs 42,44 and a second position (shown in solid lines) adjacent one of the legs 42,44, preferably leg 42, of the second base frame 28. The second overhead beam is slidably moveable laterally of the second base frame middle portion 46 along the plane of the first beam 32 between a first position at which the first end portions 64,72 of the overhead beams 32,34 are adjacent and connectable to one another and a second position at which said first end positions 64,72 are spaced one from the other (see FIG. 5). The second beam 34 is also movable with the second base frame 28 to the second position of the second base frame 28 at which the respective leg 42,44 of the second base frame 28 and the second overhead beam 34 are generally horizontal immediately adjacent the respective truck sidewall 18,20, preferably sidewall 18.

It should be understood that the second overhead beam 34 can be immediately adjacent the same sidewall as the first overhead beam 32 when in the transport position. However, it is preferred that, in the transport position, the first and second beams 32,34 be on opposed sides of the truck bed 16 in order to facilitate load balancing and increased uniformity.

Referring to FIGS. 7 and 8, a first means 80 is associated with the first overhead beam 32 for releasably maintaining the first overhead beam 32 relative to the middle portion 46 of the second base frame 28. The first means 80 preferably is a channel 82 having first and second end portions 84,86. The first end portion 84 is fixedly connected to the first end portion 64 of the first beam 32 and the second end portion 86 has a hook 88 extendable over and about a portion of the middle portion 46 of the second base frame 28. The first means 80 functions to maintain the first base frame 26 in a generally horizontal position during assembly and disassembly of the second overhead beam 34 to the first overhead beam 32.

The overhead beams 32,34 are preferably "I" beams with the lower lateral protrusions of the "I" forming the tracks 68,78. The first means 80 is connected to one of the upper lateral protrusions of the "I" and extend beyond the first end portion 64 of the first beam 32 to facilitate guiding the second beam 34 into alignment and contact with the first beam 32 during assembly of the overhead beams 32,34.

The second means 90, such as bolts, are provided for releasably connecting the first end portions 64,72 of the overhead beams 32,34 one to the other with the truck 68,78 of each being aligned one with the other.

Means 92 is also provided for releasably maintaining the second base frame 28, the upright 30 and the first and second overhead beams 32,34 at said preselected positions (see FIGS. 1 and 3). These maintaining means 92 are preferably quick couplers, as are well known in the art. The means 92 can be bolts if preferred by the operator.

The first end portions 64,72 of the overhead beams 32,34 are of a mating, non-linear configuration having first and second spaced apart planar sections 94,96 and 94,,96, connected by an edge 98,98' angularly oriented relative to the first and second sections which extend in a direction generally along the plane of the respective beams 32,34.

Referring to FIG. 9, the upright 30 preferably is of "U" or channel configuration with the opening of the "U" facing the second base frame 28. A holding member 100, preferably a plate or bar is connected to the legs of the upright 30 and extend across the opening of the "U" or channel adjacent a lower end of the upright. A portion of the first end portion 64 of the first overhead beam 32 is positionable behind the holding member 100 and within the upright 30 and thereby supports the beam 32 in the second horizontal or transport position (FIGS. 2 and 3) of the first base frame 26 and upright 30.

Figure 10:
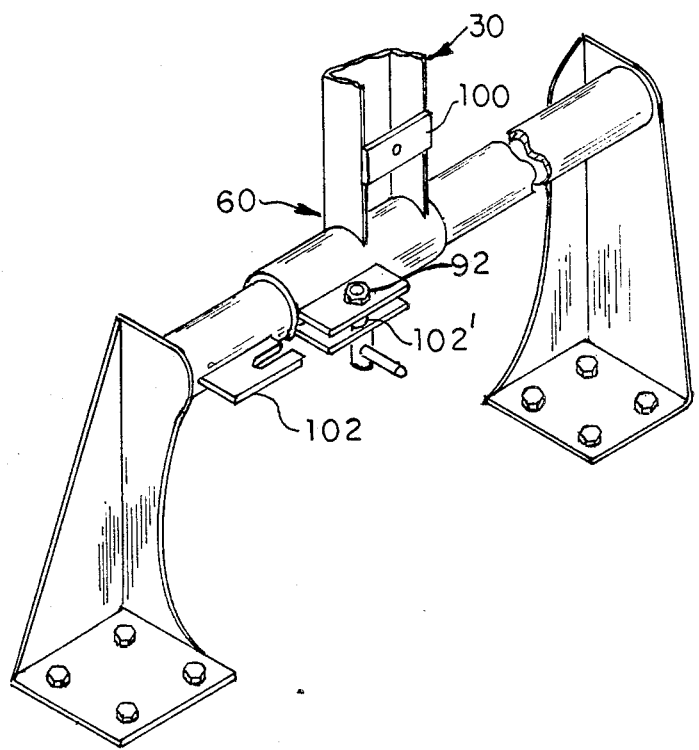
FIG. 10 is a diagrammatic partial perspective view of the holding means of the first base frame and associated first beam.

Referring to FIG. 10, it is also preferred that the first base frame 26 has a spline or slot assembly 102 matable with a spline system or protrusion 102, associated with the first end portion 60 of the upright 30 for more rigidly maintaining the upright 30 in the elevated position and providing a slidable quick release during disassembly.

Referring to FIG. 6, a flange 104 is preferably connected to one of the legs 42,44, preferably leg 42, of the second base frame 28 adjacent the lower end thereof and the truck bed 16 for receiving the second end portion 74 of the second overhead beam 34 and supporting said beam 34 in the generally horizontal or transport position of said second base frame 28 (FIG. 2).

Referring to FIG. 1, as is known in the art, a hoist 106, for example a chain hoist, has rollers 108 and is moveable along the track 68,78 of the overhead beams 32,34.

Referring to FIGS. 2 and 3, depending upon the type of truck 14 and the expected loads to be transported, a support frame 110 having outrigger means 112,112' telescopically associated therewith can be connected to the truck 14.

Industrial Applicability

In the operation and transporting of the hoisting apparatus 10, a load can be picked up by the hoist 106, moved to the center of the truck bed 16 by moving the hoist 106 along the track 78 and deposited. The hoisting apparatus 10 can then be disassembled and stored about the centrally located load in order that the truck will have a lower overhead clearance during transport.

The hoisting apparatus 10 is disassembled by releasing the associated connecting means 10 at the first end portions 64,72 of the overhead beams 32,34, releasing the second beam 34 hoisting connection at the middle portion 46 of the second base frame 2 and sliding the second beam 34 rearwardly and free from contact with the first beam 32. The second beam 34 is then pivoted to a generally vertical position, slid along the second second base frame middle portion 46 to a location adjacent the first leg 42 of the second base frame 28 and positioned within the flange 104.

The pivotal connecting means 80 of the first overhead beam 32 to the upright 30 is then released and the first overhead beam 32 is slid upwardly along the upright 30, freed from contact of the hook 88 with the second base frame 28 and then pivoted downwardly and lowered to position a portion of the first end portion 64 of the first overhead beam 32 behind the holding member 100. If a load is present in the truck, it often is necessary to first slide the upright 30 along the middle portion 40 before lowering it.

The upright 30 and first beam 32 are slid along the middle portion 40 of the first base frame 26 to a location spaced from the spline or slot/protrusion means 102 and immediately adjacent the truck second sidewall 20. At this location, the upright 30 and first beam 32 are pivoted to a generally horizontal position within the truck walls 18,20,22.

The legs 42,44 of the second base frame 28 are then disconnected from upright maintenance and the second base frame 28 and associated second beam are pivoted to a generally horizontal position within the truck walls 18,20,22.

The connecting and maintaining means can then be retightened to assure a more compact assembly and thereby prevent rattles and unnecessary movement.

Other aspects, objects and advantages of this invention can be obtained from a study of the drawings, the specification and the appended claims.

What is claimed is:

1. A hoisting apparatus (10) for a truck, comprising:
   a first base frame (26) having first and second end portions (36,38) and being connectable to the truck (14);
   a second base frame (28) having first and second legs (42,44) and being pivotally connectable to the truck (14) at a location spaced from said first base frame (26);
   an upright (30) being pivotally connected to and slidable along said first base frame (26) between a first position at which said upright is adjacent said first base frame first end portion (36) and extending upwardly from the first base frame (26) and a second position at which the upright (30) is positioned adjacent said first base frame second end portion (38) and extends generally horizontally;
   a first overhead beam (32) having first and second end portions (64,66), a track (68), and a length "L", said first beam (32) being pivotally connectable at said second end portion (66) to said upright (30), said length "L" being less than the distance between said base frames (26,28);
   a second overhead beam (34) having first and second end portions (72,74), and a track (78), said second beam (34) being pivotally connected to and slidable along said second base frame (28), between a first position at which the first end portions (64,72) of the beams (32,34) are adjacent and connectable to one another, the tracks (68,78) of the beams (32,34) are aligned one with the other, and extend generally horizontally, and a second position at which the second beam (34) is adjacent one of the second base frame legs (42,44) and the second beam (34) and second base frame (28) extend substantially horizontally;
   first means (80) for releasably maintaining the first overhead beam (32) generally horizontally at the spaced apart positions of the overhead beams (32,34); and
   means (92) for releasably maintaining the second base frame (28), the upright (30) and the first and second overhead beams (32,34) at said preselected positions.

2. An apparatus, as set forth in claim 1, wherein the second overhead beam (34) is slidably moveable relative to the second base frame (28) along the first overhead beam (32).

3. An apparatus, as set forth in claim 1, wherein the overhead beams (32,34) have first ends of a nonlinear mating configuration.

4. An apparatus, as set forth in claim 1, wherein the overhead beams (32,34) are of "I" cross-sectional configuration.

5. An apparatus, as set forth in claim 1, wherein the first means (80) is a channel (32) having first and second end portions (84,86), said first end portion (84) being fixedly connected to the first end portion (64) of the first beam (32) and said second end portion (86) having a hook (88) extendable over the second base frame (28) at the generally horizontal position of the first beam (32).

6. An apparatus, as set forth in claim 5, wherein the overhead beams (32,34) are of "I" configuration and the channel (82) of the first means (80) extends about one of the upper protrusions of both overhead beams (32,34) in the connected position of said beams (32,34) one to the other.

7. An apparatus, as set forth in claim 1, wherein the upright (30) is of "U" cross-sectional configuration, a holding member (100) is connected across the legs of the "U" adjacent a lower end of the upright (30) and a portion of the first end portion (64) of the first overhead beam is positionable behind the holding member (100).

8. An apparatus, as set forth in claim 1, wherein the first base frame (26) has one of a protrusion and slot (102) matable with the first end portion (66) of the upright (30).

9. An apparatus, as set forth in claim 1, where the first end portions (64,72) of the overhead beams (32,34) are of a mating, nonlinear configuration each having first and second spaced apart sections (94,94' and 96,96') which extend generally along the plane of the respective beam (32,34), said first and second sections (94,94' and 96,96') of each beam (32,34), being connected by a respective edge (98,98') angularly oriented relative to the respective first and second sections (94,96 and 94',96').

10. An apparatus, as set forth in claim 9, wherein the overhead beams first end portions (64,72) are connectable through respective sections 94,94' and 96,96' one to the other.

11. An apparatus, as set forth in claim 1, including a flange (104) connected to the second base frame (28) and being of a size and configuration for receiving the second end portion (74) of the second overhead beam (34).

12. An apparatus, as set forth in claim 1, including a hoist (106) having rollers (108) and being movable along the track (68,78) of said overhead beams (32,34).

13. An apparatus, as set forth in claim 1, including a support frame (110) connectable to the truck (14) and extending across the truck width adjacent the rear edge (24), and outrigger means (112) telescopically connected to the support frame (110).

14. A hoisting apparatus (10) for a truck (14) having a bed (16), first and second sidewalls (18,20), a front wall (22) and a rear edge (24), comprising:

a first base frame (26) connectable to the truck (14) and extending across at least a portion of the truck bed (16) adjacent the truck front wall (22);

a second base frame (28) pivotally connectable to the truck (14) and extending across at least a portion of the truck bed (16) adjacent the rear edge (24);

an upright (30) being pivotally connected to and slidably along said first base frame (26) between a first position at which said upright is generally an equal distance between said truck sidewalls (18,20) and extending upwardly from the first base frame (26) and a second position at which the upright (30) is positioned adjacent one of the truck sidewalls (18,20) and extends generally horizontally;

a first overhead beam (32) having first and second end portions (64,66), a track (68), and a length "L", said first beam (32) being pivotally connectable at said second end portion (66) to said upright (30), said length "L" being less than the distance between said base frames (26,28);

a second overhead beam (34) having first and second end portions (72,74), a track (78) and a middle portion (76), said second beam (34) being pivotally connected to and slidable along said second base frame (28), between a first position at which the first end portions (64,72) of the beams (32,34) are adjacent and connectable to one another, the tracks (68,78) of the beams (32,34) are aligned one with the other, and extend generally horizontally, and a second position at which the second beam (34) is adjacent one of the truck sidewalls (18,20) and the second beam (34) and second base frame (28) extend substantially horizontally;

first means (80) for releasably maintaining the first overhead beam (32) generally horizontally at the spaced apart positions of the overhead beams (32,34); and means (92) for releasably maintaining the second base frame (28), the upright (30) and the first and second overhead beams (32,34) at said preselected positions.

15. A hoisting apparatus (10) for a truck (14) having a bed (16), first and second sidewalls (18,20), a front wall (22) and a rear edge (24), comprising:

a first base frame (26) having first and second end portions (36,38) and a middle portion (40), said first and second end portions (36,38) being connectable to the truck bed (!6) at a location adjacent the truck front wall (22) with said middle portion (40) extending across at least a portion of the truck bed (16) at a location spaced from said bed (16);

a second base frame (28) having first and second legs (42,44) and a middle portion (46) each having first and second end portions, said first and second end portions (56,58) of said middle portion (46) each being connected to the first end portion (48,52) of a respective first and second leg (42,44), and said second leg (42,44) and said second end portion (50,54) of said first and second legs (42,44) being pivotally connectable to said truck bed (16) at a location adjacent said rear edge (24);

an upright (30) having first and second end portions (60,62), said first end portion (60) being pivotally and slidably connected to the middle portion (40) of said first base frame (26), and said second end portion (62) having a plurality of spaced openings (61), said upright (30) being pivotally movable between a first position at which the upright (30) is generally perpendicular to the truck bed (16) and a second position at which the upright (30) is generally parallel to the truck bed (16), and being slidably moveable between a first position at which the upright (30) is generally an equal distance from the truck first and second sidewalls (18,20) and a second position at which the upright (30) is positioned adjacent one of said truck sidewalls (18,20);

a first overhead beam (32) having first and second end portions (64,66), and a track (68), said first overhead beam (32) being releasably and pivotally connected to the second end portion (62) of the upright (30) and having a length "L" less than the distance between the upright (30) and the middle portion (46) of the second base frame (28);

a second overhead beam (34) having first and second end portions (72,74), a middle portion (76), and a track (78), said first end portion (72) being releasably connected to the first end portion (64) of the first overhead beam (32), said middle portion (76) being pivotally and slidably connected to the middle portion (46) of said second base frame (28), said second overhead beam (34) being slidably moveable along the middle portion (46) of said second base frame (28) between a first position generally an equal distance from the truck first and second sidewalls (18,20) and a second position adjacent the one of said legs (42,44) of the second base frame (28), and slidably moveable laterally of the second base frame (28) between a first position at which the first end portions (64,72) of the overhead beams (32,34) are adjacent one another and a second position at which said first end portions (64,72) are spaced one from the other;

first means (80) for releasably maintaining the first overhead beam (32) relative to the middle portion (46) of the second base frame (28); and second means (90) for releasably connecting the first end portions (64,72) of the overhead beams one to the other with the track (68,78) of each being aligned one with the other.

* * * * *